Figure 1:
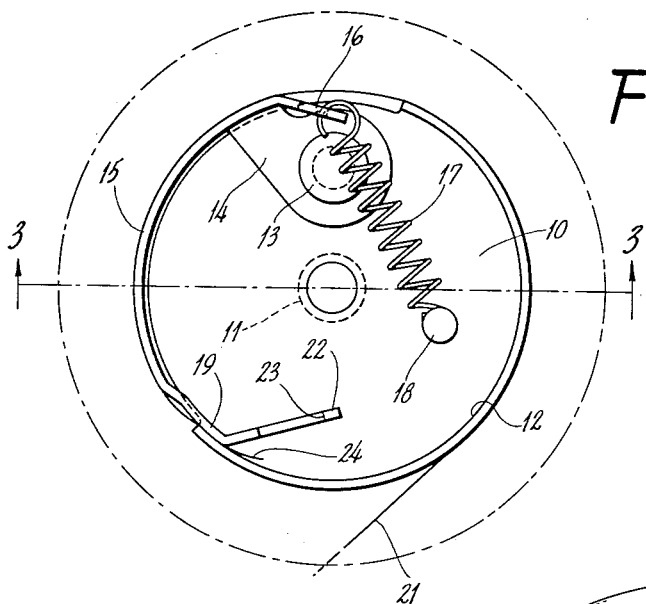

Oct. 18, 1955 H. BETZ 2,721,042
COLLAPSIBLE RIBBON SPOOL
Filed Oct. 26, 1951

INVENTOR.
HERMAN BETZ
BY Jesse A. Holton
ATTORNEY

United States Patent Office 2,721,042
Patented Oct. 18, 1955

2,721,042
COLLAPSIBLE RIBBON SPOOL

Herman Betz, Wethersfield, Conn., assignor to Underwood Corporation, New York, N. Y., a corporation of Delaware Application October 26, 1951, Serial No. 253,263

3 Claims. (Cl. 242—72)

This invention relates to a spool, reel, or the like upon which ribbon, film, tape, wire, or the like may be wound and more particularly to such a spool or reel which may be collapsed after the material has been fully wound thereon so that the wound material may be bodily removed from the spool without unwinding therefrom. The invention also provides means for attaching or anchoring the inner end of the material to be wound upon the spool to facilitate the beginning of the winding operation and to prevent the winding tension from causing a slippage of the material about the hub of the spool.

It is an object of this invention to provide an improved spool or reel for ribbon, film, tape, wire, or other lightweight, flexible material, which may be collapsed after the material has been wound thereupon to permit said material to be bodily removed without unwinding from the spool.

It is a further object of the invention to provide such a spool with an extremely simple but effective means for attaching thereto the inner end of the material to be wound upon the spool.

These and further objects, features and advantages will become apparent as the description of a preferred embodiment of the invention proceeds.

Figure 2:
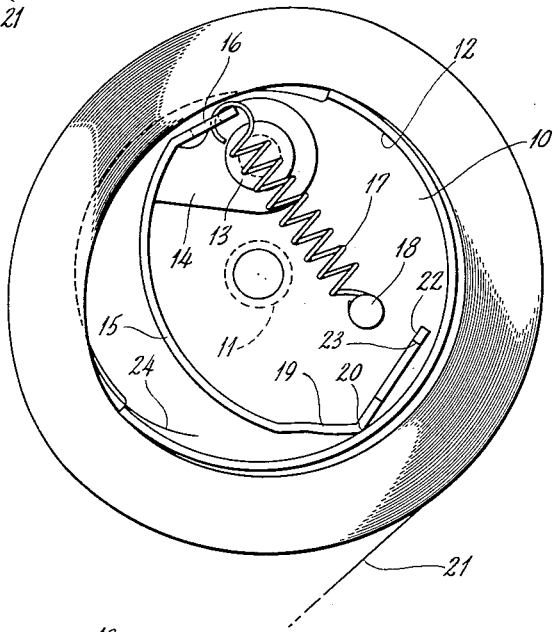
Figure 3:
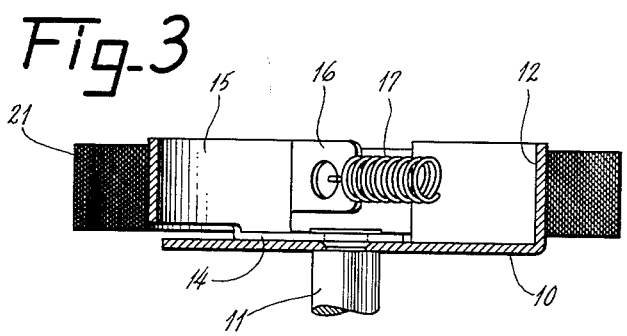

Referring now to the drawing:

Figure 1 is a side elevational view of a spool or reel made in accordance with the present invention, showing said spool in its normal condition for winding and indicating substantially one convolution of material wound on said spool, the material when fully wound being indicated by dot-and-dash lines, Figure 2 is a side elevational view of the spool with the material fully wound thereon and showing said spool in its collapsed condition, and Figure 3 is a sectional view taken on the line 3—3 of Figure 1.

The spool of the present invention comprises a rotatable disk 10 secured at its center to a drive shaft 11 and provided with a flange 12. The flange 12 is concentric with the center of the disk 10 and describes an arc about said center of somewhat more than 180 degrees. The exact length of the flange 12 is not important, but for best results the arc formed by said flange should be somewhere between a semicircle and three quarters of a circle.

The disk 10 is provided with a pivot pin 13 upon which is mounted an ear 14 of a member 15. The member 15 is provided with a curved portion which when said member is in its outer stop position is circumferentially aligned with the flange 12, whereby said curved portion of the member 15 and the flange 12 constitute a substantially continuous drum upon which the ribbon, film, wire, or the like 21 may be wound. The member 15 is provided with an ear or tab 16, and a spring 17 is connected at one end to said ear and at its other end to a pin 18 carried by the disk 10. The member 15 is swingable about the pivot 13 between two extreme stop positions, the outer stop position being determined by the abutment of a portion 19 of said member against the underside of one end of the flange 12, as indicated in Figure 1, and the inner stop position being determined by the abutment of an angular portion 20 of said member against the inner edge of the flange 12, as indicated in Figure 2.

As the member 15 is moved from the Figure 1 position to the Figure 2 position, the spring 17 moves over the center of the pivot 13, said spring 17 thereby serving to resiliently hold the member 15 in either stop position to which said member may be moved. From an inspection of Figure 2, it is apparent that with the member 15 in its inner stop position, the pin 18 is nearly on a line with the pivot 13 and that portion of the ear 16 to which one end of the spring 17 is attached and, that as a result, the angular portion 20 is held against the flange 12 with a relative light pressure. When the member 15 is swung from the Figure 2 position to the Figure 1 position, the spring 17 moves considerably over the center of the pivot 13, to thereby hold said member in its outer stop position under a considerably greater pressure than it is held in its inner stop position.

The member 15 is provided with a finger piece 22, which may conveniently have a fingertip receiving opening 23 therein, whereby said member may be manually moved from one of its stop positions to the other.

At the beginning of a winding operation the member 15 is swung to its inner stop position as indicated in Figure 2 and an end 24 of the material to be wound upon the spool is placed beneath one end of the flange 12. The member 15 is then moved to its outer stop position, whereupon the portion 19 of said member clamps the end of said material firmly against the inner edge of the flange 12 to thereby anchor the end of said material and facilitate the beginning of the winding operation and prevent the winding tension from causing the material to slip about the circumference of the spool. After the winding operation has been completed, the member 15 is swung to its Figure 2 position, thereby collapsing the spool and permitting the material 21 to be bodily removed endwise from the spool without unwinding therefrom.

Having thus described the invention, what is claimed is:

1. A collapsible spool comprising a rotatable disk, a flange on said disk, said flange being concentric with the center of said disk and describing an arc of more than 180 degrees, a pivot carried by said disk, a member mounted on said pivot and movable thereabout between an outer stop position and an inner stop position, said member having a portion which when said member is in its outer stop position is circumferentially aligned with said flange, a tab on said member near said pivot, a coil spring anchored at one end to said tab and at the other end to said disk at a point which when said member is in its inner stop position is nearly on a line including said tab and said pivot and opposite said pivot from said tab to thereby hold said member in its inner stop position with a light pressure, said spring moving considerably over the center of said pivot when said member is in its outer stop position to thereby hold said member in its outer stop position under a greater pressure than it is held in its inner stop position, and a finger piece on said member whereby said member may be manually moved from one of its stop positions to the other.

2. A collapsible spool comprising a circular disk, a peripheral flange on said disk, said flange describing an arc greater than a semicircle, a pin mounted on said disk, a member pivoted on said pin and swingable about said pin from an outer stop position to an inner stop position, said member having a portion remote from said pin bearing against the inner side of one end of said flange when said member is in its outer stop position and having another portion which is circumferentially aligned with said flange when said member is in its outer stop position, means whereby said member may be manually moved from one stop position to the other, and spring means resiliently holding said member in the stop position to which it is moved.

3. A collapsible spool comprising a rotatable disk, a flange on said disk, said flange being concentric with the center of said disk and describing an arc of more than 180 degrees, a member pivotally mounted upon said disk and swingable from an outer stop position to an inner stop position, said member having a first means which abuts said flange to define said outer stop position and a second means which abuts said flange to define said inner stop position, said member having a portion which when said member is in its outer stop position is circumferentially aligned with said flange whereby said flange and said portion of said member constitute a substantially continuous drum upon which strip material may be wound, overcenter spring means connected at one end to said disk and at the other end to said member, said overcenter spring means resiliently holding said member in whichever of its stop positions said member may be located, and a finger piece on said member whereby said member may be manually moved from one stop position to the other.

References Cited in the file of this patent

UNITED STATES PATENTS

| | | |
|---|---|---|
| 2,059,242 | Jung | Nov. 3, 1936 |
| 2,087,928 | Spencer et al. | July 27, 1937 |
| 2,341,957 | Storey | Feb. 15, 1944 |
| 2,535,693 | Murray | Dec. 26, 1950 |